United States Patent
Young et al.

(10) Patent No.: US 9,009,070 B2
(45) Date of Patent: Apr. 14, 2015

(54) MOBILE EXPENSE CAPTURE AND REPORTING

(75) Inventors: Kyle Young, Duval, WA (US); Michael Ehrenberg, Seattle, WA (US); Freddy Kristiansen, Helsinge (DK); Sunil Garg, Issaquah, WA (US); Lisa Mueller, Seattle, WA (US); Sangram Salunkhe, Redmond, WA (US); Daniel Schuster, Duval, WA (US); Alvin Manalastas, Bellevue, WA (US); Nitinkumar Shah, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 102 days.

(21) Appl. No.: 13/206,582

(22) Filed: Aug. 10, 2011

(65) Prior Publication Data

US 2012/0259748 A1 Oct. 11, 2012

Related U.S. Application Data

(60) Provisional application No. 61/472,432, filed on Apr. 6, 2011.

(51) Int. Cl.
| | |
|---|---|
| *G07G 1/12* | (2006.01) |
| *G07G 5/00* | (2006.01) |
| *G06Q 20/00* | (2012.01) |
| *G06Q 40/02* | (2012.01) |
| *G06Q 40/00* | (2012.01) |

(52) U.S. Cl.
CPC ............. *G06Q 40/02* (2013.01); *G06Q 40/12* (2013.01)

(58) Field of Classification Search
None
See application file for complete search history.

(56) References Cited

U.S. PATENT DOCUMENTS 6,826,473 B1   11/2004   Burch et al.
(Continued)

FOREIGN PATENT DOCUMENTS

| JP | 2008234586 A | 10/2008 |
| WO | 2006060254 A1 | 6/2006 |

OTHER PUBLICATIONS

"International Search Report", Mailed Date: Oct. 8, 2012, Application No. PCT/US2012/031775, Filed Date: Apr. 1, 2012, pp. 9.
"Concur Mobile for Smartphones", Retrieved at <<http://www.ers.psu.edu/docs/documentation/QuickReferenceGuides/2009Upgrade/ConcurMobile.pdf>>, 2010, pp. 4.
(Continued)

*Primary Examiner* — Paul Danneman
(74) *Attorney, Agent, or Firm* — Damon Rieth; Jim Ross; Micky Minhas (57) ABSTRACT

A mobile computing device based expense capture and reporting system is provided. A mobile expense capture application is an integral part of a networked expense management service such as a Customer Relationship Management (CRM) or Enterprise Resource Planning (ERP) service. A user interface enables users to enter expense related information and accept/reject/edit prompted values for various entries. Upon completion of the entries, the information is transmitted to the networked service and/or stored locally. At least a portion of the information is automatically provided based on a location and/or action of the user. Furthermore, the mobile computing device is capable of capturing an expense document and retrieving at least some of the expense information from the captured document.

20 Claims, 9 Drawing Sheets

(56) References Cited

U.S. PATENT DOCUMENTS

| | | | |
|---|---|---|---|
| 8,359,239 B1* | 1/2013 | Cook et al. | 705/19 |
| 2001/0042032 A1 | 11/2001 | Crawshaw et al. | |
| 2004/0083134 A1 | 4/2004 | Spero et al. | |
| 2004/0260633 A1 | 12/2004 | Lee | |
| 2005/0205660 A1 | 9/2005 | Munte | |
| 2007/0083401 A1 | 4/2007 | Vogel et al. | |
| 2008/0005168 A1 | 1/2008 | Huff et al. | |
| 2009/0300068 A1 | 12/2009 | Tang | |
| 2010/0159909 A1 | 6/2010 | Stifelman | |
| 2010/0228659 A1 | 9/2010 | Pandipati | |
| 2010/0331043 A1 | 12/2010 | Chapman et al. | |
| 2011/0052075 A1* | 3/2011 | Comay et al. | 382/190 |
| 2011/0271278 A1* | 11/2011 | Dittrich | 718/1 |

OTHER PUBLICATIONS

"Mitek Systems Launches Business Expense Management Application on the App Store", Retrieved at <<http://www.miteksystems.com/pdf/Mobile_Receipt_FINAL_072009.pdf>>, Jul. 20, 2009, pp. 2.

"Accorto Cloud T&E", Retrieved at <<http://www.accorto.com/sites/default/files/Accorto_Cloud.pdf>>, Retrieved Date: Nov. 9, 2010, pp. 4.

"Expense Management", Retrieved at <<http://www.zslinc.com/Pdf/Expense%20Management.pdf>>, Retrieved Date: Apr. 5, 2011, pp. 4.

"Supplementary Search Report issued in European Patent Application No. 12768292.0", Mailed Date: Jul. 30, 2014, 7 Pages.

* cited by examiner

MOBILE EXPENSE CAPTURE AND REPORTING

CROSS REFERENCE TO RELATED APPLICATIONS

This application claims the benefit of U.S. Provisional Patent Application Ser. No. 61/472,432 filed on Apr. 6, 2011, which is incorporated herein by reference.

BACKGROUND

With the proliferation of computing devices of all sizes, shapes, and capabilities, and networking, many business and personal transactions can be performed through locally installed or hosted applications. Enhanced computing technologies enable users to perform tasks twenty four hours a day, seven days a week, at any location. Employees can access business services from anywhere in the world recording business transactions, accessing reports, connecting with others, and so on.

Many companies use expense reporting systems to reimburse employees for expenses which they incur for business purposes. One of the challenges for employees is tracking the various expenses incurred for business purposes, particularly when expenses are incurred when the employee is away from her computer such as traveling. In such situations, employees typically need to use some other process (e.g. saving paper receipts) to keep track of expenses and then add those expenses to an expense report.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a mobile computing device based expense capture and reporting system. A system according to embodiments may be an integral part of a networked expense management service such as a Customer Relationship Management (CRM) or Enterprise Resource Planning (ERP) service. A mobile application may provide a user interface enabling a user to enter expense related information and accept/reject/edit prompted values for various entries. Upon completion of the entries, the information may be transmitted to the networked service and/or stored locally. At least a portion of the information may be automatically provided based on a location and/or action of the user. Furthermore, the mobile computing device may be capable of capturing an expense document and retrieve at least some of the expense information from the captured document.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, a mobile application may provide a user interface enabling a user to enter expense related information and accept/reject/edit prompted values for various entries. Upon completion of the entries, the information may be transmitted to the networked service and/or stored locally. At least a portion of the information may be automatically provided based on a location and/or action of the user. Furthermore, the mobile computing device may be capable of capturing an expense document and retrieve at least some of the expense information from the captured document. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for facilitating networked financial transactions such as expense management. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network.

Figure 1:
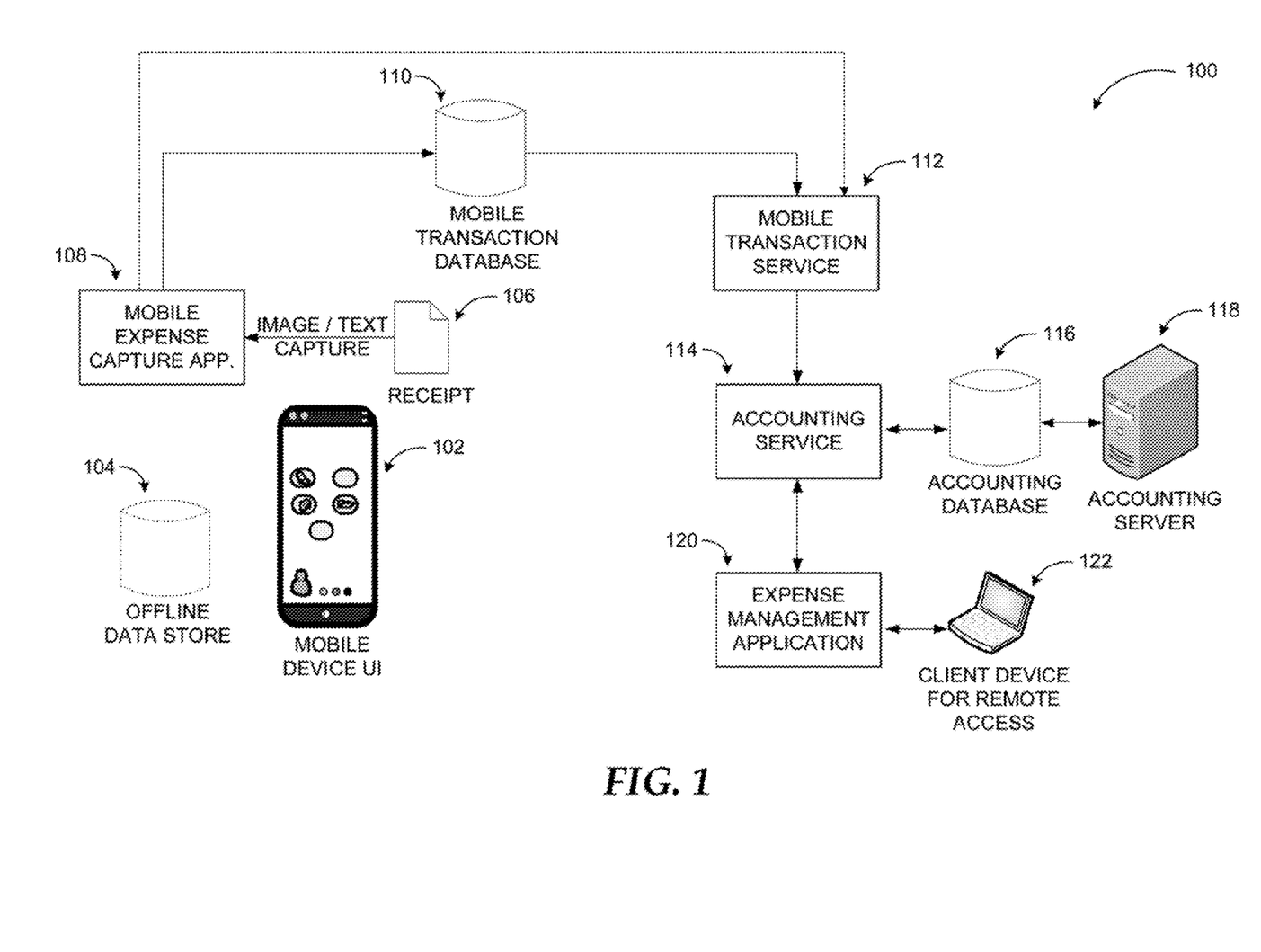
FIG. 1 is a conceptual diagram illustrating interactions between a networked expense management service and a mobile expense application.

FIG. 1 is a conceptual diagram illustrating interactions between a networked expense management service and a mobile expense application. Embodiments may be implemented in hosted services such as Customer Relationship Management (CRM) applications, which enable recording, analysis, and reporting of business transactions in conjunction with a variety of other business services such as Enterprise Resource Planning (ERP) services.

Embodiments enable capturing expenses that are incurred when employees are traveling or otherwise away from their computer. Some embodiments include a mobile phone application 108 to capture key expense information and/or associated receipts 106 for expense reporting purposes. The expense information and/or receipts 106 may then be sent to the employee's company expense management application 120, which may be part of a ERP service 114, through a mobile phone data connection. The receipts and information may then be available when the employee completes his/her expense report. This helps the employee to easily capture the information on the go without needing to keep track of paper receipts or amounts paid in cash.

A mobile expense application 108 based approach according to some embodiments may provide an integrated and automated user experience, integration with a mobile device's camera or attached scanner module to capture a receipt, local storage of expense information and receipts at an offline data store 104, ability to send the expense information and receipts to a cloud-based ERP service 114 using a defined interface, and authentication and/or identity protection services.

The cloud-based ERP service 114 may include a database 116 to capture expense information and receipts, a defined interface by which the mobile expense application 108 can send expense information and receipts 106, and authentication of the user/mobile device to assure that the user belongs to and is valid for a registered organization.

In an example scenario, a mobile expense application 108 may activate a user interface 102 for expense entry upon user indication or automatically (for example in response to detecting user location or a payment transaction through the mobile device). User location may be determined through Global Positioning Service (GPS) information, cellular tower triangulation, wireless data network node detection, compass, and acceleration sensors, matching of camera input to known geo-position photos, and similar methods. In some scenarios, the GPS information from the device may be combined with a search engine feedback to suggest an actual business location (e.g., the name of the restaurant, etc.). Another approach may include determining the user's location based on access control systems (e.g., scanning a user's access card as they enter a premise). Similarly, information about the user such as from a calendaring application or a currently executed application may be used to determine the user's location.

Some of the expense information may be determined from capturing and analyzing an image of an expense document such as a receipt. The captured information may be stored locally for subsequent user or transmission to an expense management application 120. Alternatively, the information may be transmitted to a mobile transaction database 110 of the ERP service 114 through a defined interface such that individual fields can be filled automatically and accounting and other processes can be performed by the service. A mobile transaction service 112 may be employed in the transmission of information. In some embodiments, the information may be transmitted directly from the mobile expense application 108 to mobile transaction service 112. An instance of mobile transaction service 112 may serve many instances of on-premises systems (e.g. multiple instances of ERP service 114). ERP database 116 and ERP service 114 may be managed by one or more servers such as ERP server 118. Furthermore, the user may be enabled to access the expense records subsequently through an expense management application (e.g., on a client device 122) and process them further.

Figure 2:
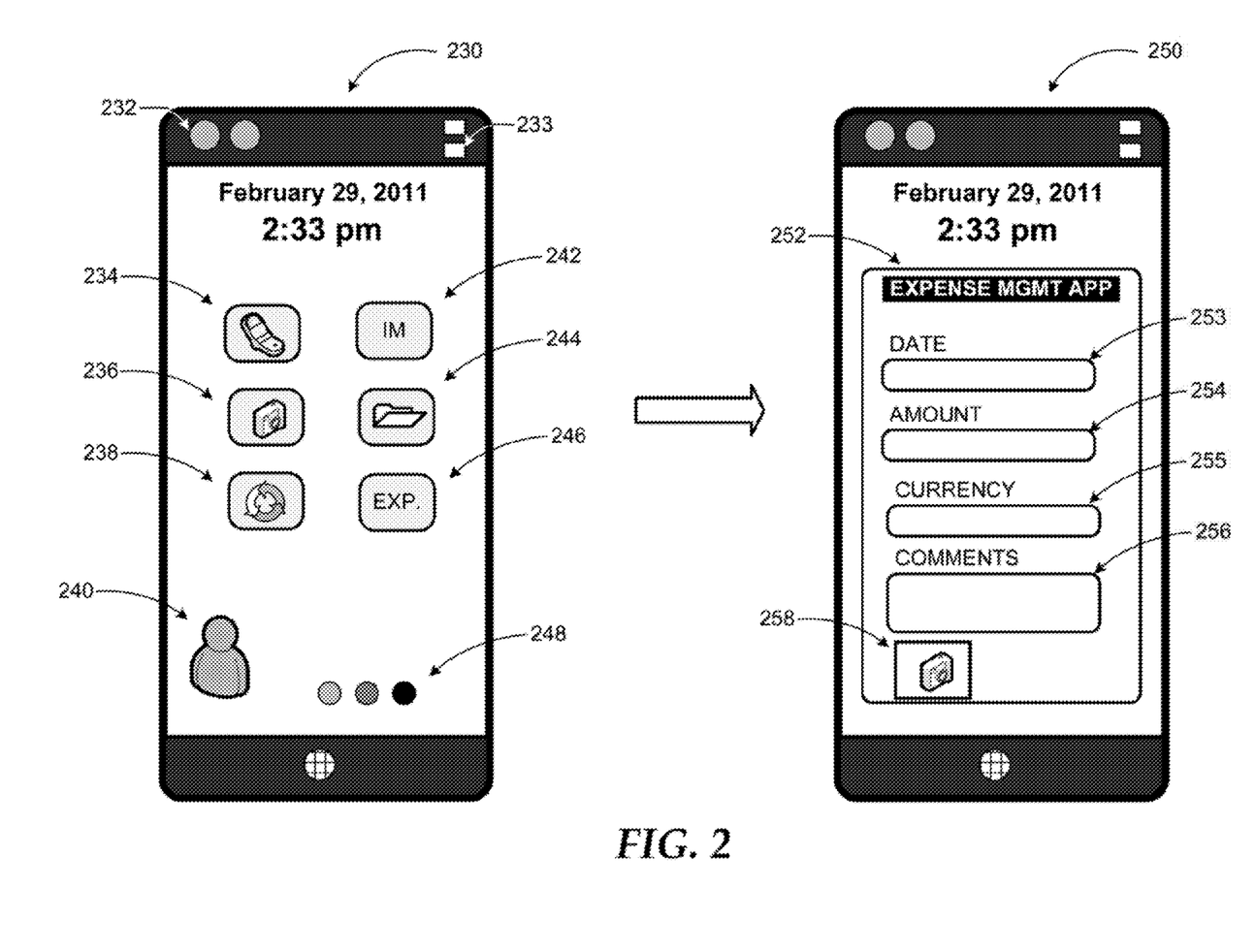
FIG. 2 illustrates activation of an example mobile expense management application user interface.

FIG. 2 illustrates activation of an example mobile expense management application user interface. The user interface illustrated in diagram 200 is just an example user interface of a mobile communication device. Embodiments are not limited to this example user interface or others discussed above.

A system according to embodiments provides a dedicated user experience for quickly and easily capturing expense information such as user identity, company identity, date/time, address for the expense, amount, currency, notes, etc. Furthermore, a dedicated user experience for capturing an expense receipt using the mobile device's camera and associating the receipt to the expense information may also be provided. User interaction may be facilitated by specialized devices such as cellular phones, smart phones, dedicated devices, or by general purpose computing devices (fixed or portable) such as handheld computers, vehicle mount computers, laptops, etc.

An example mobile device may include a speaker and a microphone in addition to a number of physical control elements such as buttons, knobs, keys, etc. (232, 233). Such a device may also include a camera or similar ancillary devices that may be used in conjunction with different communication modalities and to capture expense document images. The example user interface 230 displays date and time and a number of icons for different applications such as phone application 234, messaging application 242, camera application 236, file organization application 244, and web browser 238. The user interface may further include a number of virtual buttons (248) such as Dual Tone Multi-frequency (DTMF) keys for placing a call. Icon 246 may activate a mobile expense application to capture and report expense items.

User interface 250 illustrates an example user interface for a mobile expense application on a mobile device. The mobile expense application user interface may display a default date (using system date) and location. In some embodiments, a date 253, a currency 255 (using location), an amount 254 (using optical character recognition of receipt), etc. associated with a captured expense (e.g., a receipt) may be displayed. Furthermore, the user may be enabled to enter comments (256) associated with the expense and activate an integrated camera to take a picture of the receipt or the location of the expense (e.g., a business where a purchase was made). Captured expense information and receipts may be stored locally on the mobile device. The expense information and receipts may also be sent to the expense management service when the mobile device (e.g., phone) is connected to a cellular network, a data network, a public telephone network, or similar system. Synchronization with the expense management service may be upon user initiated action or automatic.

The mobile expense application may be configured to authenticate the user and/or the mobile device to the expense management service (e.g., password protection, public/private key authentication, and other encryption methods) to protect the data processed by the service as well as user's private information. The user may be provided feedback and option to edit automatically defaulted information. Inputs for the expense entries may be provided by conventional keyboard (physical or virtual) entries as well as voice commands (through speech recognition), gestures, and comparable input methods.

Figure 3:
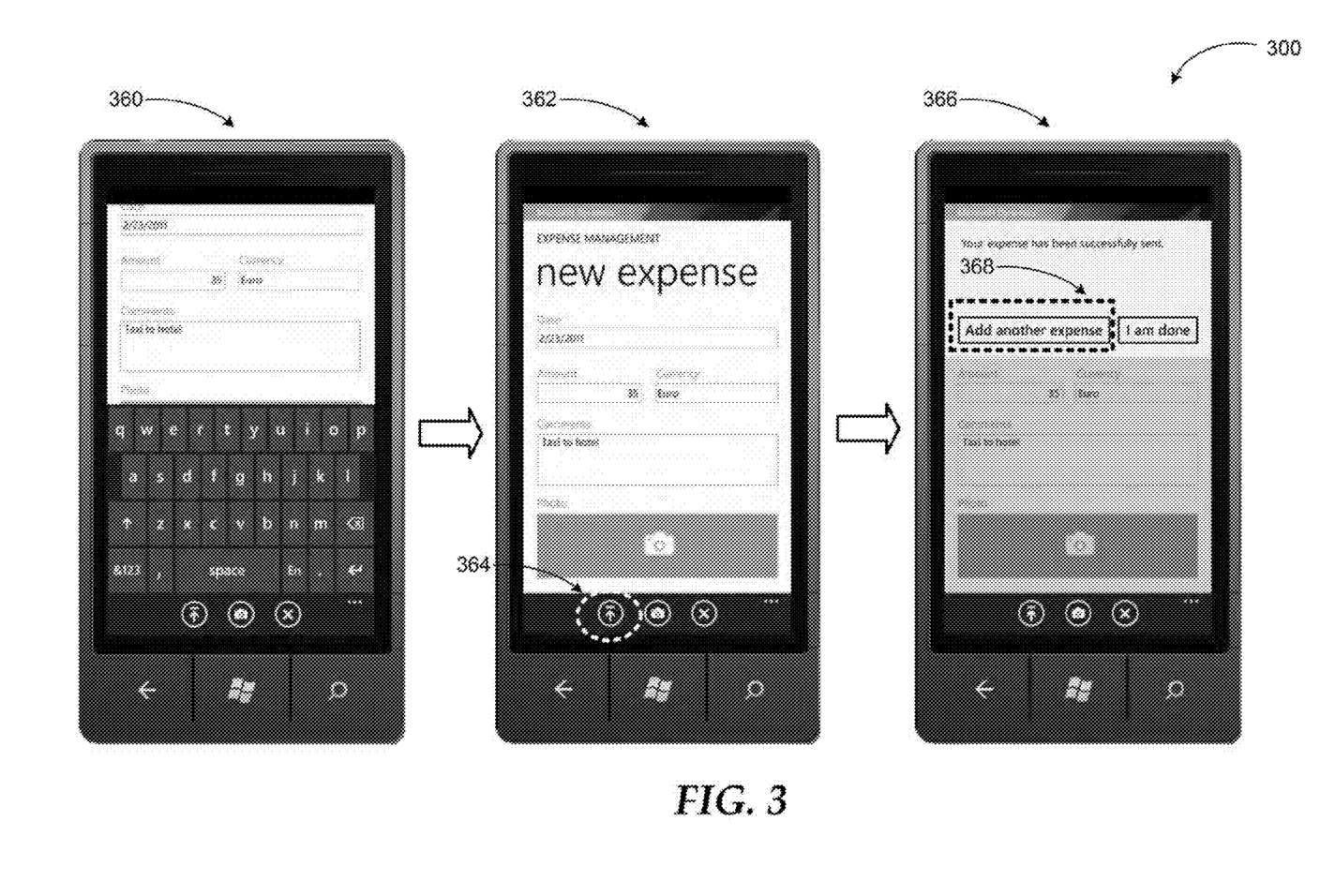
FIG. 3 illustrates example user interfaces for entry of expense information in a mobile expense management application.

FIG. 3 illustrates example user interfaces for entry of expense information in a mobile expense management application. The example interfaces in diagram 300 include user interface 360 illustrating manual entry of an expense such as 35 Euro for a taxi fare to hotel at Feb. 23, 2011 through an on-screen keyboard. Some of the information such as the date may be filled in automatically by the expense capture application.

Upon completing manual expense entry, a user may press on a button 364 indicating that they are done entering the expense at example user interface 362. The completion may trigger transition to example user interface 366, where the user may be prompted to select between adding another expense (368) or closing the application. At the selection screen, the expense entry fields may be grayed or similarly inactivated.

Figure 4:
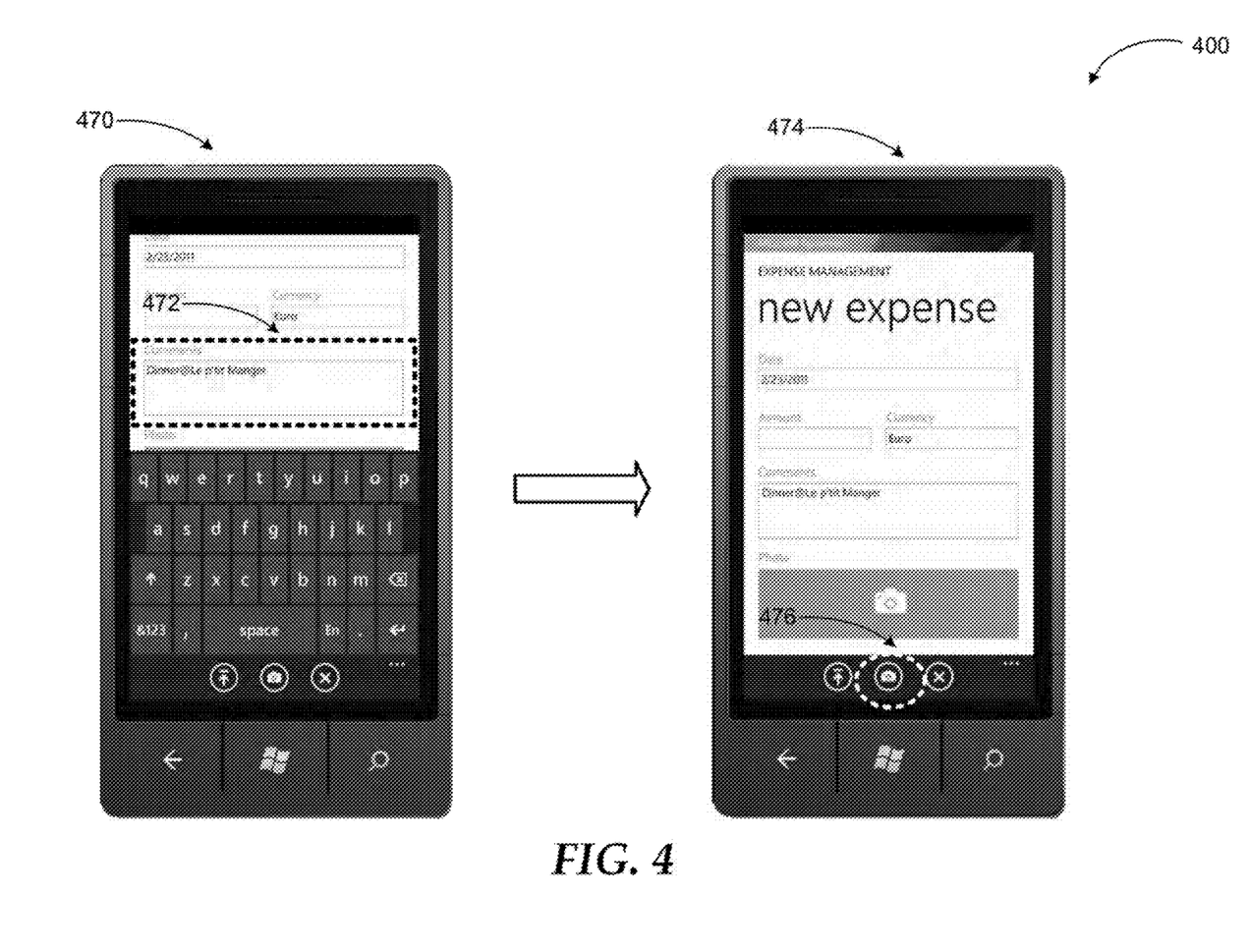
FIG. 4 illustrates example user interfaces for activation of expense document capture in a mobile expense management application.

FIG. 4 illustrates example user interfaces for activation of expense document capture in a mobile expense management application. Diagram 400 includes two example user interfaces for a process of automatically capturing expense information such as through scanning a receipt. Even in the automatic expense capture, some of the information may be entered manually (or all of it captured automatically). User interface 470 shows how the expense type 472 may be entered through the on-screen keyboard. Following the entry of the expense type, the application may transition to user interface 474, where the user may press on an image capture button 476 that activates an integrated camera to capture the image of a receipt, for example.

In other embodiments, an integrated of connected scanner may be used to capture images of expense documents. Moreover, the expense type and similar information may also be captured through character recognition from the recorded image. The image capture process may be activated automatically or through other means such as a gesture, a positioning of the camera over a receipt, etc.

Figure 5:
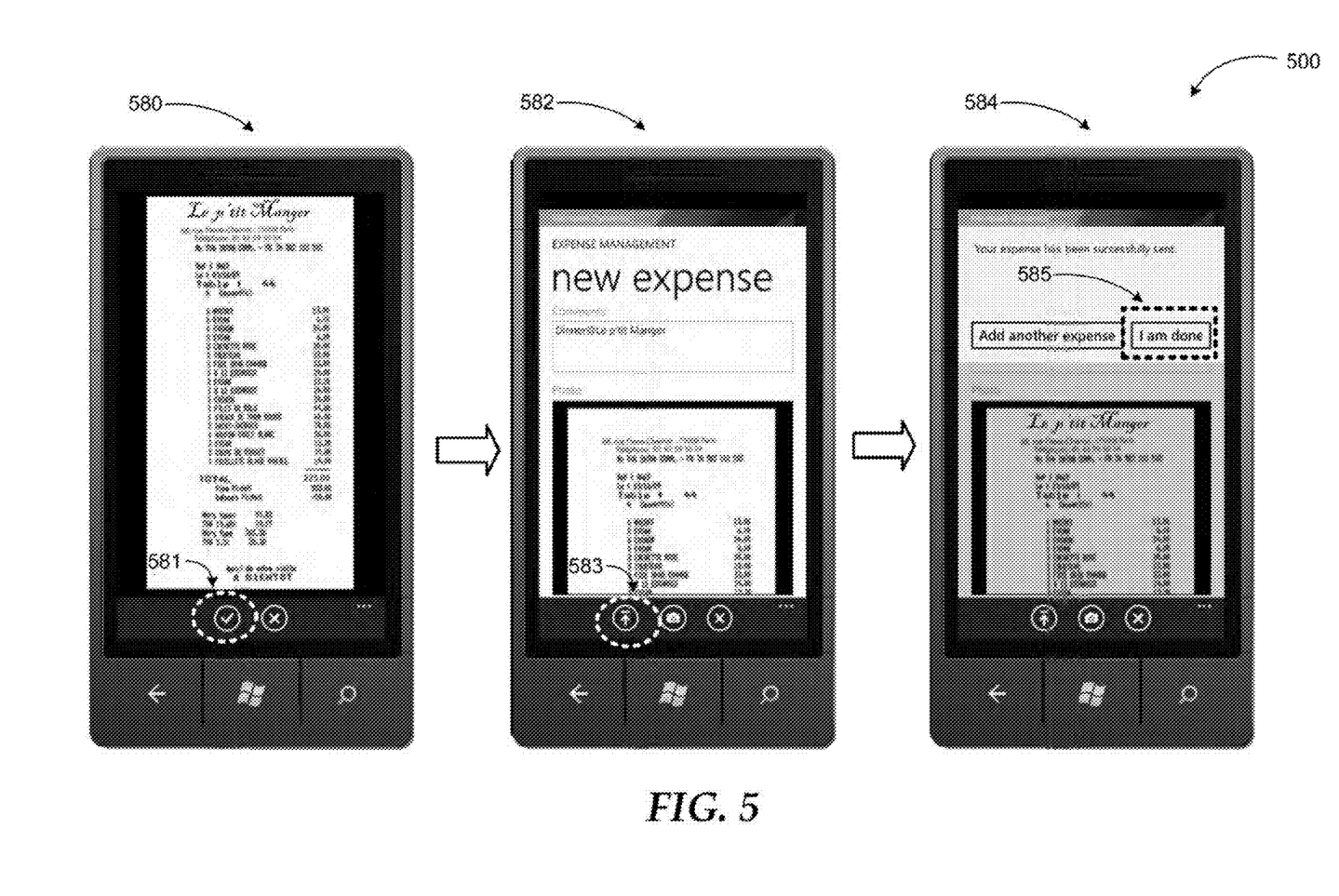
FIG. 5 illustrates example user interfaces for capture of an expense document in a mobile expense management application.

FIG. 5 illustrates example user interfaces for capture of an expense document in a mobile expense management application. Example user interfaces of diagram 500 illustrate a continuation of the receipt recording based expense capture process described in conjunction with FIG. 4.

Example user interface 580 shows the captured image of the receipt on the mobile device's screen and a confirmation button 581, which may be used to indicate the completion of the receipt capture process. The captured receipt image may be subjected to optical character recognition and expense information such as expense type, amount, currency, etc. may be filled in automatically as shown in example user interface 582.

Upon completing receipt capture based expense entry, a user may press on a button 583 indicating that they are done recording the expense at example user interface 582. The completion may trigger transition to example user interface 584, where the user may be prompted to select between adding another expense or closing the application (585).

Figure 6:
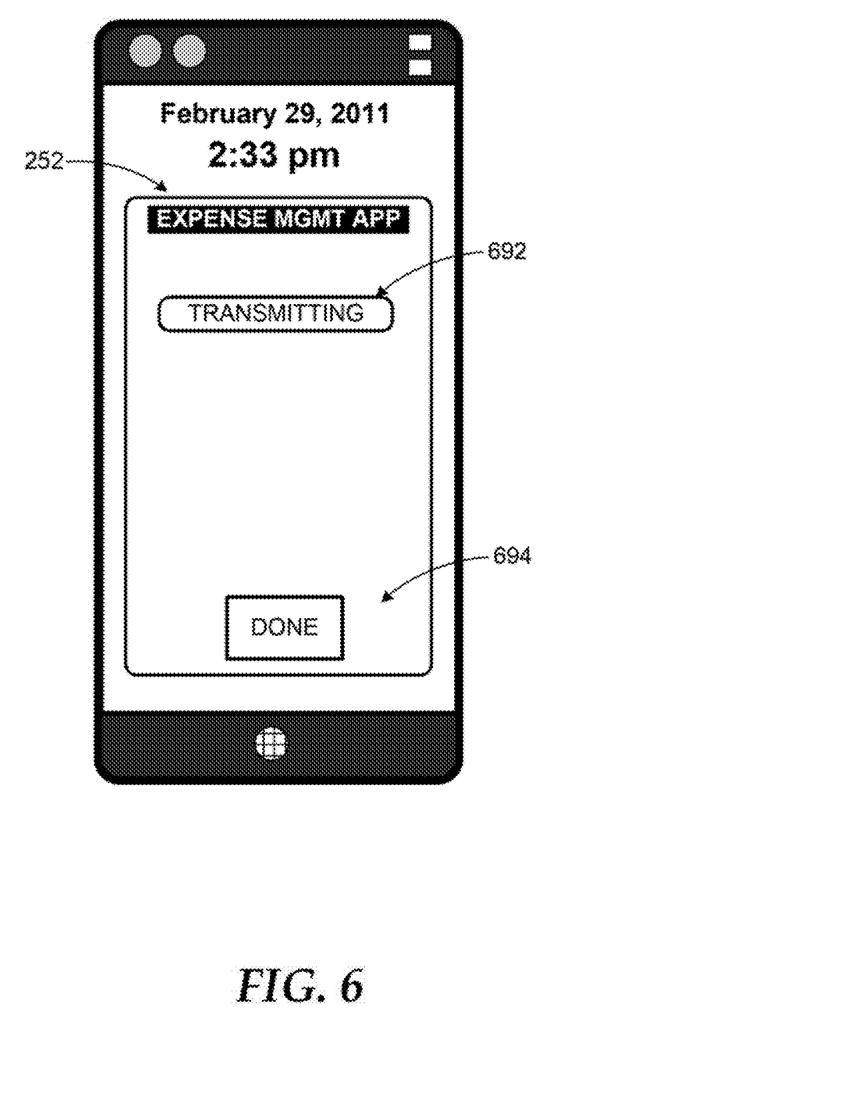
FIG. 6 illustrates an example user interface upon completion of an expense item entry transmitting the transaction to an expense management service.

FIG. 6 illustrates an example user interface upon completion of an expense item entry transmitting the transaction to an expense management service. Whether en expense entry is completed manually or automatically, the mobile expense application 252 may present user interface 600 providing the user the option of transmitting (692) the recorded information to a hosted expense management service such as a ERP application. When the transmission is complete, the user may close the mobile expense application user interface by pressing on a "Done" button 694.

In other embodiments, the mobile expense application 252 may transmit expense information for one or more entries automatically upon completion of an entry, upon connection to a network, or based on a predefined schedule (e.g., select times of the day).

The different processes, user interfaces, and systems discussed in FIG. 1 through FIG. 6 may be implemented using distinct hardware modules, software modules, or combinations of hardware and software. Furthermore, such modules may perform two or more of the processes in an integrated manner. While some embodiments have been provided with specific examples for expense capture and reporting, embodiments are not limited to those. Indeed, embodiments may be implemented in various systems using a variety of mobile devices and applications and with additional or fewer features using the principles described herein.

Figure 7:
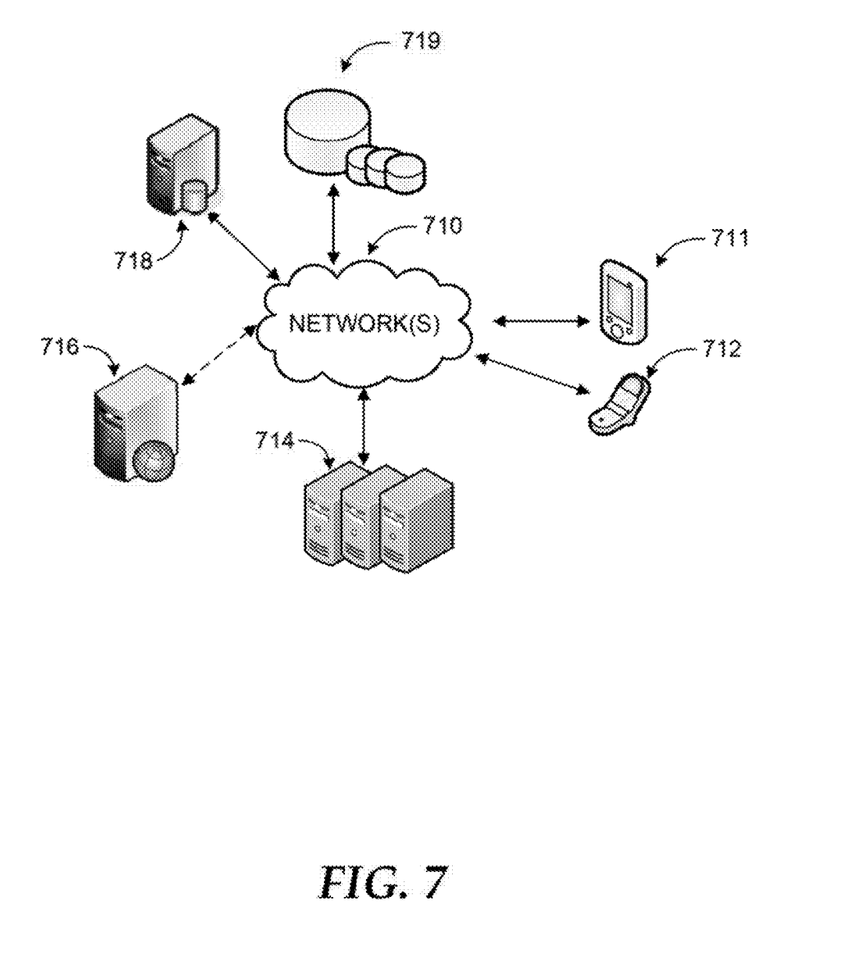
FIG. 7 is a networked environment, where a system according to embodiments may be implemented.

FIG. 7 is an example networked environment, where embodiments may be implemented. A platform for providing expense management services may be implemented via software executed over one or more servers 714 such as a hosted service. The platform may communicate with client applications on individual mobile devices such as a smart phone 711, cellular phone 712, or similar devices ('client devices') through network(s) 710.

Client applications executed on any of the client devices 711-712 may interact with a hosted service providing expense management services from the servers 714, or on individual server 716. The hosted service may provide multi-faceted services such as accounting, resource management, etc. As part of the provided services, expenses may be captured by a mobile expense application executed on a client device and transmitted to the service as described above. Some or all of the processing associated with the expense management may be performed at one of more of the servers 714 or 716. Relevant data such as expense records, captured receipt images, and similar data may be stored and/or retrieved at/from data store(s) 719 directly or through database server 718.

Network(s) 710 may comprise any topology of servers, clients, Internet service providers, and communication media. A system according to embodiments may have a static or dynamic topology. Network(s) 710 may include secure networks such as an enterprise network, an unsecure network such as a wireless open network, or the Internet. Network(s) 710 may also include (especially between the servers and the mobile devices) cellular networks. Furthermore, network(s)

710 may include short range wireless networks such as Bluetooth or similar ones. Network(s) 710 provide communication between the nodes described herein. By way of example, and not limitation, network(s) 710 may include wireless media such as acoustic, RF, infrared and other wireless media.

Many other configurations of computing devices, applications, data sources, and data distribution systems may be employed to implement a platform providing mobile expense capture and reporting services. Furthermore, the networked environments discussed in FIG. 7 are for illustration purposes only. Embodiments are not limited to the example applications, modules, or processes.

Figure 8:
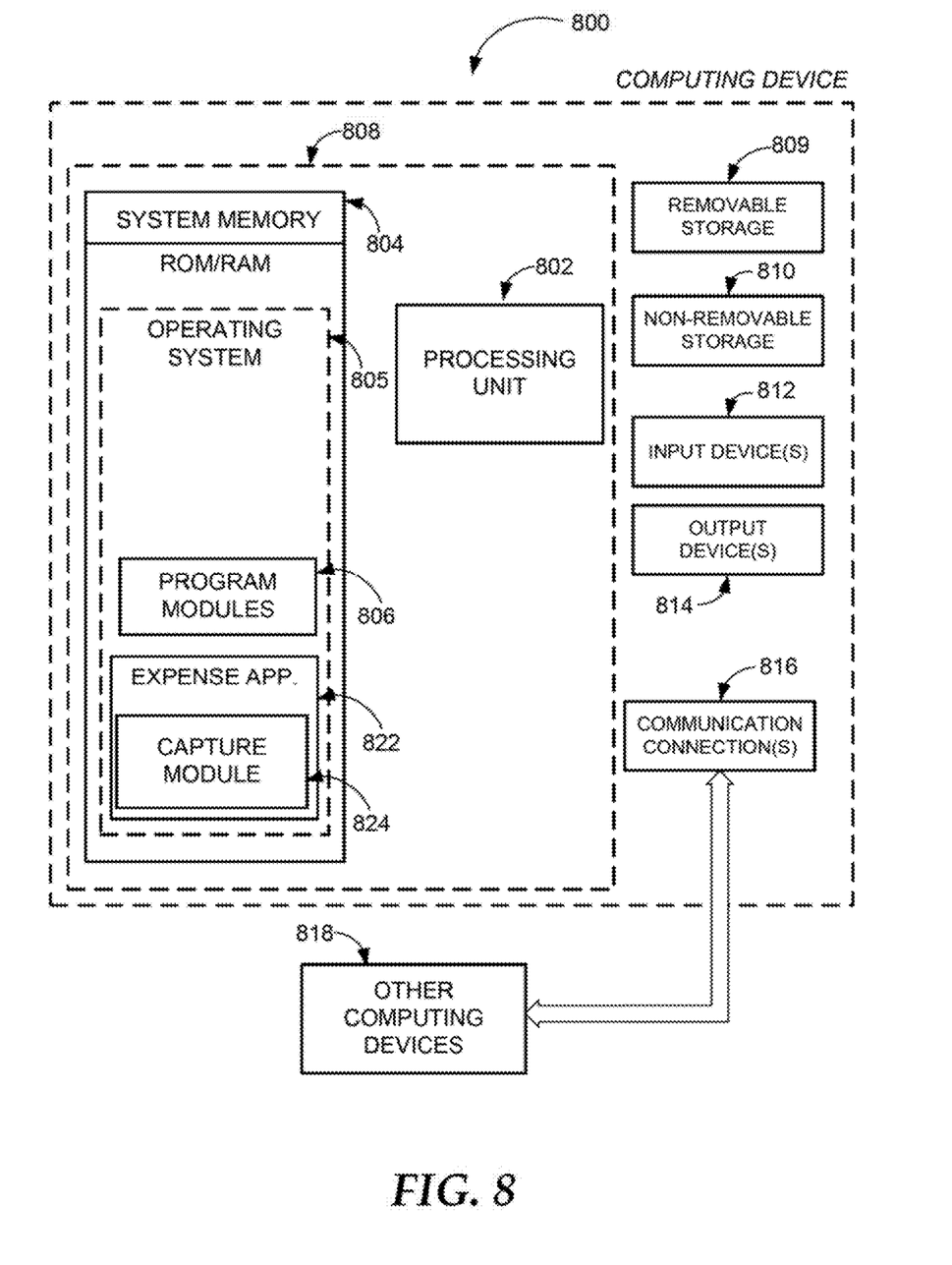
FIG. 8 is a block diagram of an example computing operating environment, where embodiments may be implemented.

FIG. 8 and the associated discussion are intended to provide a brief, general description of a suitable computing environment in which embodiments may be implemented. With reference to FIG. 8, a block diagram of an example computing operating environment for an application according to embodiments is illustrated, such as computing device 800. In a basic configuration, computing device 800 may be a mobile computing device capable of facilitating capture and reporting of expenses according to embodiments and include at least one processing unit 802 and system memory 804. Computing device 800 may also include a plurality of processing units that cooperate in executing programs. Depending on the exact configuration and type of computing device, the system memory 804 may be volatile (such as RAM), non-volatile (such as ROM, flash memory, etc.) or some combination of the two. System memory 804 typically includes an operating system 805 suitable for controlling the operation of the platform, such as the WINDOWS MOBILE®, WINDOWS PHONE®, or similar operating systems from MICROSOFT CORPORATION of Redmond, Wash. or similar ones. The system memory 804 may also include one or more software applications such as program modules 806, expense application 822, and capture module 824.

Expense application 822 may enable capture and reporting of expense items through automated suggestions and feedback. Capture module 824 may capture (e.g., through scanning) expense documents such as receipts and enable expense application 822 to determine expense items such as amount, service provider, date, location, etc. This basic configuration is illustrated in FIG. 8 by those components within dashed line 808.

Computing device 800 may have additional features or functionality. For example, the computing device 800 may also include additional data storage devices (removable and/or non-removable) such as, for example, magnetic disks, optical disks, or tape. Such additional storage is illustrated in FIG. 8 by removable storage 809 and non-removable storage 810. Computer readable storage media may include volatile and nonvolatile, removable and non-removable media implemented in any method or technology for storage of information, such as computer readable instructions, data structures, program modules, or other data. System memory 804, removable storage 809 and non-removable storage 810 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 800. Any such computer readable storage media may be part of computing device 800. Computing device 800 may also have input device(s) 812 such as keyboard, mouse, pen, voice input device, touch input device, and comparable input devices. Output device(s) 814 such as a display, speakers, printer, and other types of output devices may also be included. These devices are well known in the art and need not be discussed at length here.

Computing device 800 may also contain communication connections 816 that allow the device to communicate with other devices 818, such as over a wired or wireless network in a distributed computing environment, a satellite link, a cellular link, a short range network, and comparable mechanisms. Other devices 818 may include computer device(s) that execute communication applications, other servers, and comparable devices. Communication connection(s) 816 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 9:
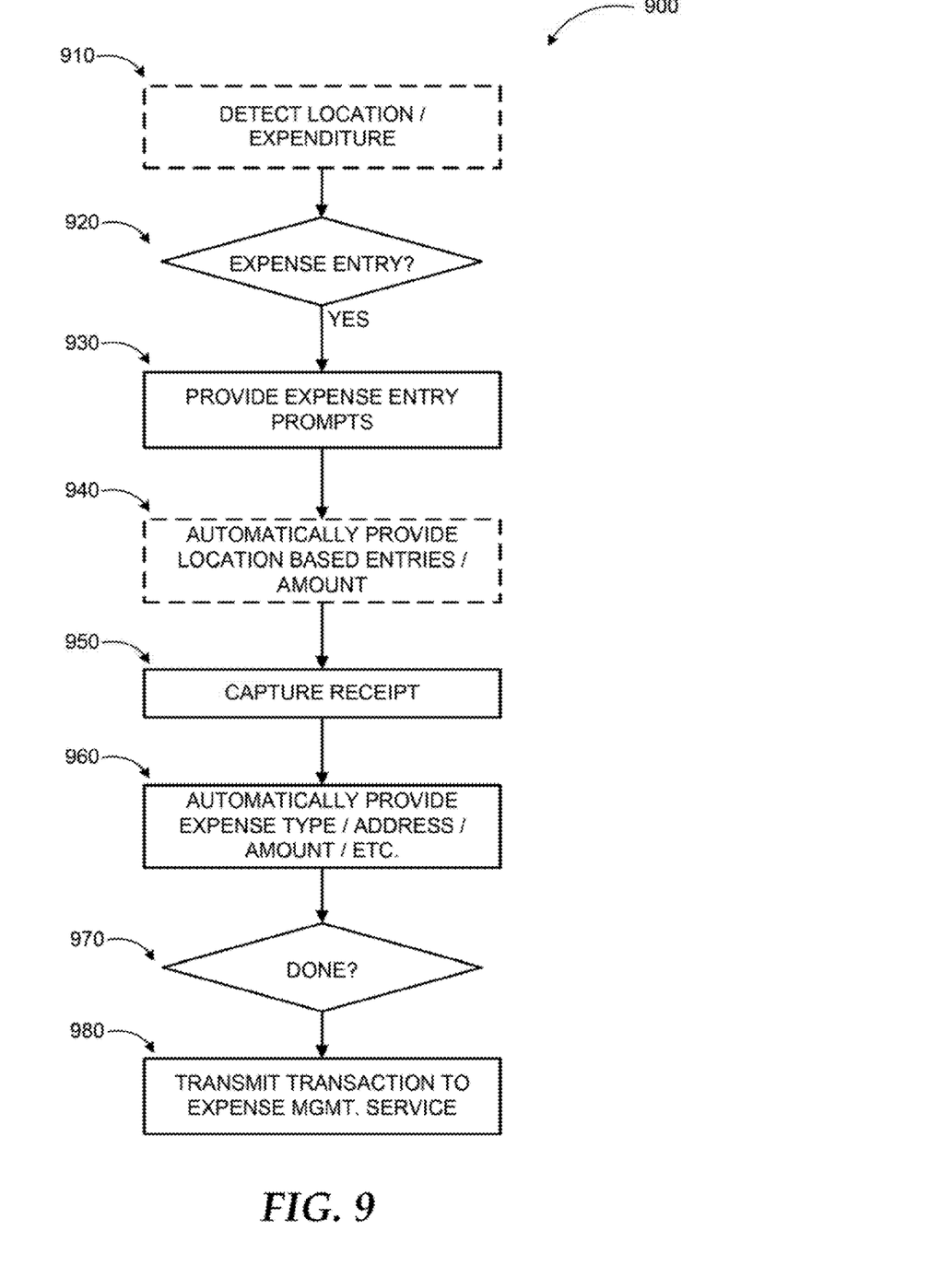
FIG. 9 illustrates a flowchart for a process of completing an expense entry on a mobile expense management application.

FIG. 9 illustrates a flowchart for process 900 of completing an expense entry on a mobile expense management application.

An example process may include an optional operation 910, where a location and/or an expenditure are automatically detected by the mobile expense application. For example, the mobile expense application may receive a location information (e.g., including the place such as a restaurant) and/or detect an expenditure (e.g., a payment being made through a transaction module in the mobile device).

At decision operation 920, the mobile application may determine whether an expense entry is to be recorded either by user activation or automatically (e.g., detection of a payment). If the expense entry if to be recorded, the user may be presented with prompts for entering expense related information at operation 930. At optional operation 940, at least some of the expense related information may be automatically provided based on the location and/or expenditure information detected at optional operation 910.

At operation 950, an expense document such as a receipt may be captured, for example, by scanning or capturing through a camera on the mobile device. The captured image may be analyzed (e.g., optical character recognition) and detected information such as expense type, address of service provider, amount, etc. may be filled in at operation 960. Upon receiving an indication that expense entry is complete from the user at decision operation 970, the mobile expense application may transmit the transaction to an expense management service at operation 980 through a predefined protocol such that the transaction can be processed automatically by the system without the user having to manually enter each expense item. The expense information may be transmitted to the cloud-based expense management service based on user demand or a predefined schedule.

The operations included in process 900 are for illustration purposes. Mobile expense capture and reporting may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for facilitating expense capture and reporting, the method comprising:
   automatically detecting an expenditure facilitated through a transaction module of a mobile computing device;
   determining whether an expense entry associated with the detected expenditure is to be recorded by user activation or automatically;
   in response to detecting an expense document associated with the detected expenditure within a field of view of a camera of the mobile computing device, displaying an expense capture user interface for activation on the mobile computing device;
   receiving expense information through the expense capture user interface from the user, wherein at least a portion of the expense information is automatically filled in;
   presenting one or more options on the expense capture user interface for the user to accept, reject, and edit the portion of the expense information automatically filled in; and
   upon completion of the expense capture, transmitting the expense information wirelessly to an expense management service through a defined interface of the expense management service to automatically fill fields of the expense management service such that the expense management service is configured to perform one or more accounting services.

2. The method of claim 1, further comprising:
   capturing the expense document; and
   determining at least a part of the automatically filled in portion of the expense information from the captured expense document.

3. The method of claim 2, further comprising:
   analyzing the captured expense document employing optical character recognition.

4. The method of claim 1, further comprising:
   storing the expense information at the mobile computing device for subsequent processing; and
   deleting the stored expense information at the mobile computing device upon transmission to the expense management service.

5. The method of claim 1, further comprising:
   determining the user's location; and
   determining at least a part of the automatically filled in portion of the expense information from the user's location.

6. The method of claim 5, wherein the user's location is determined based on at least one from a set of: Global Positioning Service (GPS) information, cellular tower triangulation, wireless data network node detection, an integrated compass, an acceleration sensor, matching of a camera input to known geo-position photos, information from an access control system, information from a calendaring application, and information from a currently executed application on the mobile computing device.

7. The method of claim 1, further comprising:
   determining the automatically filled in portion of the expense information from the detected expenditure.

8. The method of claim 1, further comprising:
   authenticating at least one of the mobile computing device and the user to the expense management service.

9. The method of claim 8, further comprising:
   connecting to an authentication/identity protection service for authenticating at least one of the mobile computing device and the user.

10. The method of claim 1, further comprising:
    enabling the user to access the expense management service subsequently and process the expense information through a distinct computing device.

11. The method of claim 1, wherein receiving the expense information through the expense capture user interface from the user includes receiving input from the user through one of: a physical keyboard entry, a virtual keyboard entry, a voice command, and a gesture.

12. A mobile computing device capable of facilitating expense capture and reporting, the mobile computing device comprising:
    a communication module;
    a memory; and
    a processor coupled to the communication module and the memory adapted to execute an expense management application that is configured to:
       automatically detect one of a location of a user and an expenditure;
       in response to the detection of the location or expenditure, display an expense capture user interface for activation on the mobile computing device;
       receive expense information through the expense capture user interface from the user, wherein at least a portion of the expense information is automatically filled in;
       upon completion of the expense capture, transmit the expense information wirelessly to a cloud-based expense management service through a defined interface of the cloud-based expense management service to automatically fill fields of the cloud-based expense management service such that the cloud-based expense management service is configured to perform one or more accounting services; and
       provide the user access to the expense information at the cloud-based expense management service through another computing device such that the user can process the expense information at the cloud-based expense management service.

13. The mobile computing device of claim 12, wherein the processor is further configured to:
    capture an expense document using one of a camera attached to the mobile computing device and a scanner attached to the mobile computing device; and
    determine at least a part of the automatically filled in portion of the expense information from the captured expense document.

14. The mobile computing device of claim 13, wherein the processor is further configured to:
    capture an image of the expense document through one of the camera attached to the mobile computing device and the scanner attached to the mobile computing device.

15. The mobile computing device of claim 12, wherein the processor is further configured to transmit the expense information to the cloud-based expense management service through one or more of a cellular network, a data network, a and public telephone network upon one of a completion of an expense entry and a connection to a network.

16. The mobile computing device of claim 12, wherein the mobile computing device includes one of a cellular phone, a smart phone, a handheld computer, a vehicle mount computer, and a laptop computer.

17. The mobile computing device of claim 12, wherein the expense information includes at least one from a set of: a user identity, a company identity, a date/time, an address for the expense, an amount of the expense, a currency of the expense, and a comment.

18. A computer-readable memory device with instructions stored thereon for facilitating expense capture and reporting, the instructions comprising:
    automatically detecting an expenditure facilitated through a transaction module of a mobile computing device;
    determining whether an expense entry associated with the detected expenditure is to be recorded by user activation or automatically;
    in response to detecting an expense document associated with the detected expenditure within a field of view of a camera of a mobile computing device, displaying an expense capture user interface for activation on the mobile computing device;
    receiving expense information through the expense capture user interface from the user, wherein at least a portion of the expense information is automatically filled in based on a portion of the the expense document that is captured by the camera;
    presenting one or more options on the expense capture user interface for the user to accept, reject, and edit the portion of the expense information automatically filled in;
    storing the expense information locally;
    upon completion of the expense capture, transmitting the expense information wirelessly to a cloud-based expense management service through a defined interface of the cloud-based expense management service to automatically fill fields of the cloud-based expense management service such that the cloud-based expense management service is configured to perform one or more accounting services;
    upon completion of the transmission, deleting the locally stored expense information; and
    providing the user access to the expense information at the cloud-based expense management service through another computing device such that the user can process the expense information at the cloud-based expense management service.

19. The computer-readable memory device of claim 18, wherein the instructions further comprise:
    enabling the user to edit automatically filled expense information through one of: a physical keyboard, a virtual keyboard, a voice command, and a gesture.

20. The computer-readable memory device of claim 18, wherein the expense information is transmitted to the cloud-based expense management service based on one of user demand and a predefined schedule.

\* \* \* \* \*